Patented Nov. 1, 1932

1,886,260

UNITED STATES PATENT OFFICE

ERNEST B. MILLER, OF BALTIMORE, MARYLAND, ASSIGNOR TO THE SILICA GEL CORPORATION, OF BALTIMORE, MARYLAND, A CORPORATION OF MARYLAND

METHOD OF REFINING LIQUID HYDROCARBONS

No Drawing. Application filed March 3, 1925, Serial No. 12,996. Renewed April 8, 1932.

The present invention relates to a method of refining liquid hydrocarbons.

The principal object of the invention is to obtain a water-white product when treating such hydrocarbons as benzol and cracked gasoline and kerosene and to improve the color when treating such products as hydrocarbon lubricating oils.

The so-called "silica gel" process of refining these and other liquids is well-known. In this process the oil is treated with an adsorbent such as silica gel, the impurities being adsorbed in the pores thereof. Thereafter the adsorbent is treated to free it of the substances taken up in its pores so that it may be used again for refining more liquid. In this method of refining no acid is employed.

The present invention consists of treating the hydrocarbon as outlined above in connection with the "silica gel" process, but a slightly acidulated adsorbent is used. It is surmised that the acid acts as a catalyst.

In the refining of a liquid hydrocarbon like benzol according to the present invention, the benzol after recovery from the coke oven gases is treated with a slightly acidulated adsorbent like acidulated silica gel. For this purpose, before the unrefined benzol is brought into contact with the adsorbent, the active adsorbent has added thereto a small quantity of acid solution. Preferably an acid solution as non-voltaile as possible is employed, such as sulphuric acid (10–50% solution). The amount of acid added to the adsorbent for the treatment of the benzol is from 0.02 to 0.3% of the weight of the adsorbent, this percentage being based on acid of 100% concentration. The acid solution may be added by spraying it over the adsorbent. Of course, the amount of acid added will vary with the strength of the acid solution and with the amount of the impurities in the benzol. A few simple experimental runs will determine the proper amount of acid solution for any particular benzol.

The benzol obtained after the treatment with this acidulated adsorbent is not water-white, or, if substantially so, on exposure to light or heat it turns dark and remains so.

The next step in the process consists in distilling the product that has been treated with the acidulated adsorbent. The distillate comes off water-white and remains so permanently.

The acidulated adsorbent, after it has been used to treat the hydrocarbon, is freed of substances adsorbed thereby, as by heating, so that the adsorbent may be used again for treating more hydrocarbon. Thus the adsorbent is used over and over. The amount of acid solution added to the adsorbent will depend on the amount that is lost in the "activation" or "regeneration" of the adsorbent.

The amount of acid lost in this treatment will depend on the boiling point of the acid and the temperature to which the adsorbent is heated or subjected during "regeneration". If the temperature is above the boiling point of the acid, some and perhaps all of it will be driven off in the "regeneration" step. The amount of acid present in the adsorbent, however, when it is used to treat the hydrocarbon to be refined should be substantially within the limits specified above.

For refining cracked gasoline and kerosene, the process is the same as for treating benzols, except that a distillation may not be required although is sometimes desirable after treating with the aciduated adsorbent. The amount of acid employed is substantially the same as in treating benzol.

The process may also be employed for refining hydrocarbon lubricating oils. A product is obtained which has a much better color than when refined by other methods. In treating lubricating oils, the steps are the same as for refining cracked gasoline. In other words, the process for treating lubricating oils comprises bringing the oil into contact with the acidulated adsorbent such as acidulated silica gel, and thereafter "regenerating" the adsorbent so that it may be used for treating more oil. After the step of "regeneration", the adsorbent has a suitable acid solution like sulphuric acid added thereto as by spraying. The amount of acid solution added to the adsorbent, in this case, may vary from 1 to 3% of the weight of the adsorbent, depending upon the kind and strength of the acid and the impurities in the oil being treated, the percentage given being based on acid of 100% concentration.

Instead of sulphuric acid, other acids, such as phosphoric or nitric acids, may be employed in connection with refining any of the products mentioned herein.

An adsorbent to be suitable for the present process must have a large number of very fine or ultramicroscopic pores. In order to distinguish an adsorbent suitable for this purpose from adsorbents that are unsuitable, reference may be had to the amount of water that one gram of the material adsorbs when exposed to water vapor under definite condition of temperature and partial pressure. An adsorbent that has a large number of very fine pores will adsorb more water vapor at low partial pressures than an adsorbent having the same internal volume made up of large pores. Consequently the amount of water vapor taken up by two materials that are to be compared, when exposed to the water vapor under definite condition of temperature and partial pressure, is a measure of the relative size of the pores in the material and the total internal volume of these pores. Silica gel, which is the adsorbent preferred for use in the present invention, has a total internal volume of about 0.41 cc. per gram. In other words, if the pores in silica gel are completely filled with water the amount of water taken up will be approximately 41% of the initial weight of the gel. A sufficient percentage of the total internal volume in silica gel is made up of pores of such size that the gel adsorbs water vapor to such an extent that it contains at least 21% of its own weight of water when in equilibrium with water vapor at 30° C. and a partial pressure of about 22 mm. of mercury.

Adsorbing materials suitable for the present invention should adsorb water to such an extent that they contain not less than about 10% of their initial weight of water when in equilibrium with water vapor at 30° C. and a partial pressure of substantially 22 mm. of mercury.

Instead of silica gel, other adsorbing materials having an adsorption capacity as defined above can be used provided they do not injuriously react with the acid so as to be permanently damaged thereby. As illustrations of other gels that can be used, the following are cited:—gels of tin oxide, aluminum oxide, tungstic oxide, titanic oxide, etc., gels consisting of any of said oxides with silica, and gels consisting of two or more of said oxides with or without silica.

Having thus described the invention, what is claimed as new and desired to be secured by Letters Patent is:

1. In the method of refining liquid hydrocarbon distillates, the step consisting in treating the liquid with a solid, adsorbent material impregnated with a small quantity of acid and capable of adsorbing water vapor to such an extent as to contain not less than about 10% of its own weight of such adsorbed water vapor when in equilibrium with water vapor at 30° C. and a partial pressure of substantially 22 mm. of mercury.

2. In the method of refining liquid hydrocarbon distillates, the step consisting in treating the liquid with a solid, adsorbent material impregnated with a small quantity of acid and capable of adsorbing water vapor to such an extent as to contain at least 21% of its own weight of water when in equilibrium with water vapor at 30° C. and a partial pressure of 22 mm. of mercury.

3. In the method of refining liquid hydrocarbon distillates, the step consisting in treating the liquid with a solid, artificial, adsorbent material impregnated with a small quantity of acid and capable of adsorbing water vapor to such an extent as to contain not less than about 10% of its own weight of water when in equilibrium with water vapor at 30° C. and a partial pressure of substantially 22 mm. of mercury.

4. In the method of refining liquid hydrocarbon distillates the step of treating the liquid with a hard porous gel impregnated with a slight amount of acid.

5. The method according to claim 4 wherein the gel is that of silica.

6. In the method of refining liquid hydrocarbon distillates the step of treating the liquid with a solid adsorbent material impregnated with acid in an amount not exceeding about 3% of the weight of the adsorbent material.

7. In the method of refining liquid hydrocarbon distillates the step of treating the liquid with a solid adsorbent material impregnated with acid in an amount not exceeding about 0.3% of the weight of the adsorbent.

8. In the method of refining liquid hydrocarbon distillates the step of treating the liquid with a hard porous gel and an acid in an amount not exceeding 3% of the weight of the adsorbent.

9. In the method of refining liquid hydrocarbon distillates the step of treating the liquid with a hard porous gel and an acid in an amount not exceeding about 0.3% of the weight of the adsorbent.

10. In the method of refining liquid hydrocarbon distillates the step of treating the liquid with a hard porous gel in the presence of a slight amount of acid.

11. The method according to claim 1 followed by the step of subjecting the treated oil to distillation.

In testimony whereof I hereunto affix my signature.

ERNEST B. MILLER.